(12) United States Patent
Hernandez-Sherrington et al.

(10) Patent No.: US 7,519,606 B2
(45) Date of Patent: Apr. 14, 2009

(54) SCHEMA MAPPING SPECIFICATION FRAMEWORK

(75) Inventors: Mauricio Antonio Hernandez-Sherrington, Gilroy, CA (US); Lucian Popa, San Jose, CA (US); Mary Ann Roth, San Jose, CA (US); Craig Salter, Hamilton (CA)

(73) Assignee: International Business Machines Corporation, Armonk, NY (US)

( * ) Notice: Subject to any disclaimer, the term of this patent is extended or adjusted under 35 U.S.C. 154(b) by 339 days.

(21) Appl. No.: 11/343,503

(22) Filed: Jan. 31, 2006

(65) Prior Publication Data

US 2007/0179962 A1  Aug. 2, 2007

(51) Int. Cl.
G06F 7/00 (2006.01)

(52) U.S. Cl. .................................... 707/100

(58) Field of Classification Search ............ 707/1, 707/3, 100, 102, 103 R, 104.1; 715/500, 715/760
See application file for complete search history.

(56) References Cited

U.S. PATENT DOCUMENTS

| | | | |
|---|---|---|---|
| 6,785,689 B1 | 8/2004 | Daniel et al. | |
| 7,255,411 B2 * | 8/2007 | Endo | 347/12 |
| 7,383,255 B2 * | 6/2008 | Desai et al. | 707/4 |
| 2003/0140308 A1 * | 7/2003 | Murthy et al. | 715/500 |
| 2003/0163450 A1 * | 8/2003 | Borenstein et al. | 707/1 |
| 2003/0200502 A1 * | 10/2003 | Abe et al. | 715/500 |
| 2003/0217069 A1 | 11/2003 | Fagin et al. | |
| 2004/0093344 A1 * | 5/2004 | Berger et al. | 707/102 |
| 2005/0050068 A1 * | 3/2005 | Vaschillo et al. | 707/100 |
| 2005/0097110 A1 * | 5/2005 | Nishanov et al. | 707/100 |
| 2005/0144622 A1 * | 6/2005 | Ballinger et al. | 719/315 |
| 2005/0149552 A1 * | 7/2005 | Chan et al. | 707/102 |
| 2006/0036935 A1 * | 2/2006 | Warner et al. | 715/500 |
| 2006/0195454 A1 * | 8/2006 | Davis et al. | 707/100 |
| 2006/0200499 A1 * | 9/2006 | Bhatia et al. | 707/200 |
| 2006/0230066 A1 * | 10/2006 | Kosov et al. | 707/104.1 |
| 2007/0016604 A1 * | 1/2007 | Murthy et al. | 707/102 |
| 2007/0055655 A1 * | 3/2007 | Bernstein et al. | 707/3 |
| 2007/0055692 A1 * | 3/2007 | Pizzo et al. | 707/103 R |
| 2007/0073760 A1 * | 3/2007 | Baikov | 707/102 |
| 2007/0112843 A1 * | 5/2007 | Swamy et al. | 707/102 |
| 2007/0283246 A1 * | 12/2007 | Wake et al. | 715/513 |

OTHER PUBLICATIONS

Popa et al., Translating Web Data, Aug. 2002, VLDB Endowment, pp. 1-12.*

* cited by examiner

*Primary Examiner*—Mohammad Ali
*Assistant Examiner*—Jessica N Le
(74) *Attorney, Agent, or Firm*—Schmeiser, Olsen & Watts

(57) ABSTRACT

A method and system for specifying, in a schema mapping framework, a mapping between a source schema and a target schema. The source and target schemas are schemas included in respective groups of registered, heterogeneous schemas. The source and target schemas may be of different types. Serialized versions of the source and target schemas include source objects and target objects, respectively. A mapping model is serialized into mapping objects that include logical references representing the source objects and logical references representing the target objects. The logical references are resolved to the source objects and target objects, thereby storing pointers to the source objects and to the target objects. After resolving the logical references, the mapping model includes the logical references and the pointers to the source and target objects.

3 Claims, 12 Drawing Sheets

300

```
<?xml version="1.0" encoding="UTF-8"?>
<xs:schema ... >
  <xs:element name="Bibliography">
    <xs:complexType>
      <xs:sequence>
        <xs:element name="book" maxOccurs="unbounded">
          <xs:complexType>
            <xs:sequence>
              <xs:element name="title" type="xs:string"/>
              <xs:element name="author" type="authorType"/>
            </xs:sequence>
            <xs:attribute name="year" type="xs:string"/>
          </xs:complexType>
        </xs:element>
      </xs:sequence>
    </xs:complexType>
  </xs:element>
  <xs:complexType name="authorType">
    <xs:sequence>
      <xs:element name="first" type="xs:string"/>
      <xs:element name="last" type="xs:string"/>
    </xs:sequence>
  </xs:complexType>
</xs:schema>
```

```xml
<?xml version="1.0" encoding="UTF-8"?>
<xs:schema ... >
  <xs:element name="publications">
    <xs:complexType>
      <xs:sequence>
        <xs:element name="publication" maxOccurs="unbounded">
          <xs:complexType>
            <xs:sequence>
              <xs:element name="year" type="xs:string"/>
              <xs:element name="author" minOccurs="0" maxOccurs="unbounded">
                <xs:complexType>
                  <xs:sequence>
                    <xs:element name="first" type="xs:string"/>
                    <xs:element name="last" type="xs:string"/>
                    <xs:element ref="title" maxOccurs="unbounded"/>
                  </xs:sequence>
                </xs:complexType>
              </xs:element>
            </xs:sequence>
          </xs:complexType>
        </xs:element>
      </xs:sequence>
    </xs:complexType>
  </xs:element>
  <xs:element name="title" type="xs:string"/>
</xs:schema>
```

```
Bibliography: {
   book [1..*]: {
      @year: string
      title: string
      author: AuthorType [0..1] {
         first: string
         last: string
      }}}
```

```
publications: {
      publication [1..*] {
         year: string
         author [0..*] {
            first: string
            last: string
            title [1..*] : string
         }}}
```

```
<mappingRoot>
    <input name="src" path="bibliography.xsd"/>
    <output name="trg" path="publications.xsd"
    <mapping>
        <input name="s0" path="$src/Bibliography/book"/>
        <output name="t0" path="$trg/publications/publication"/>
        <mapping>
            <input path="$s0/@year"/>
            <output path="$t0/year"/>
        </mapping>
        <mapping>
            <input path="$s0"/>
            <output name="t1" path="$t0/author"/>
            <mapping>
                <input path="$s0/author/first"/>
                <output path="$t1/first"/>
            </mapping>
            <mapping>
                <input path="$s0/author/last"/>
                <output path="$t1/last"/>
            </mapping>
        </mapping>
    </mapping>
</mappingRoot>
```

FIG. 5B

SCHEMA MAPPING SPECIFICATION FRAMEWORK

BACKGROUND OF THE INVENTION

1. Technical Field

The present invention relates to a schema mapping specification framework, and more particularly to a schema mapping specification framework for representing mappings between heterogeneous schema models.

2. Related Art

Each conventional software tool for mapping a source schema A to a target schema B utilizes its own model and language to express a high-level description of how A is to map to B, its own model to capture the semantic meaning of that high-level description, and its own architecture to interpret that model to generate executable code. These characteristics of known mapping tools lead to the following deficiencies and limitations. First, there is a significant duplication of effort with regard to development and maintenance of multiple mapping tools. Each mapping tool requires its own development team to build, develop and maintain the tool. Second, there is an inconsistent look and feel and behavior across a product family. Customers who purchase multiple products from an enterprise must become conversant with each of the mapping tools, and learn the differences and similarities between them. Finally, there is a lack of tool interoperability. A mapping produced by one tool cannot be consumed by another tool, and vice versa. Thus, there exists a need in the art to overcome the deficiencies and limitations described above.

SUMMARY OF THE INVENTION

In first embodiments, the present invention provides a method of specifying, in a schema mapping framework of a computing environment, a mapping between a source schema and a target schema, the method comprising:

registering a first plurality of heterogeneous schemas and a second plurality of heterogeneous schemas, wherein any schema of the first plurality is capable of being the source schema, and any schema of the second plurality is capable of being the target schema, and wherein the source schema and the target schema are capable of being schemas of different types;

serializing a mapping model of the schema mapping framework into one or more mapping objects including a plurality of logical references that includes a first set of one or more logical references and a second set of one or more logical references, the one or more logical references of the first set representing the one or more source objects in a one-to-one correspondence, and the one or more logical references of the second set representing the one or more target objects in a one-to-one correspondence; and resolving the first set to the one or more source objects, and the second set to the one or more target objects, wherein the resolving includes storing a plurality of pointers that include a source side set of one or more pointers to the one or more source objects, and a target side set of one or more pointers to the one or more target objects, and wherein the mapping model includes, responsive to the resolving, the plurality of logical references and the plurality of pointers.

In second embodiments, the present invention provides a system for specifying, in a schema mapping framework of a computing environment, a mapping between a source schema and a target schema, the system comprising:

means for registering a first plurality of heterogeneous schemas and a second plurality of heterogeneous schemas, wherein any schema of the first plurality is capable of being the source schema, and any schema of the second plurality is capable of being the target schema, and wherein the source schema and the target schema are capable of being schemas of different types;

means for serializing a mapping model of the schema mapping framework into one or more mapping objects including a plurality of logical references that includes a first set of one or more logical references and a second set of one or more logical references, the one or more logical references of the first set representing the one or more source objects in a one-to-one correspondence, and the one or more logical references of the second set representing the one or more target objects in a one-to-one correspondence; and means for resolving the first set to the one or more source objects, and the second set to the one or more target objects, wherein the means for resolving includes means for storing a plurality of pointers that include a source side set of one or more pointers to the one or more source objects, and a target side set of one or more pointers to the one or more target objects, and wherein the mapping model includes, responsive to the resolving, the plurality of logical references and the plurality of pointers.

In third embodiments, the present invention provides a computer program product comprising a computer-usable medium including computer-usable program code for specifying, in a schema mapping framework of a computing environment, a mapping between a source schema and a target schema, the computer program product including:

computer-usable code for registering a first plurality of heterogeneous schemas and a second plurality of heterogeneous schemas, wherein any schema of the first plurality is capable of being the source schema, and any schema of the second plurality is capable of being the target schema, and wherein the source schema and the target schema are capable of being schemas of different types;

computer-usable code for serializing a mapping model of the schema mapping framework into one or more mapping objects including a plurality of logical references that includes a first set of one or more logical references and a second set of one or more logical references, the one or more logical references of the first set representing the one or more source objects in a one-to-one correspondence, and the one or more logical references of the second set representing the one or more target objects in a one-to-one correspondence; and computer-usable code for resolving the first set to the one or more source objects, and the second set to the one or more target objects, wherein the computer-usable code for resolving includes computer-usable code for storing a plurality of pointers that include a source side set of one or more pointers to the one or more source objects, and a target side set of one or more pointers to the one or more target objects, and wherein the mapping model includes, responsive to the resolving, the plurality of logical references and the plurality of pointers.

Advantageously, the present invention provides a schema mapping specification framework that can represent mappings between heterogeneous schema models. Further, the present invention facilitates the creation of mapping applications (e.g., GUIs for entering mappings, code generators for those mappings, etc.) by software engineers. Still further, the schema mapping specification framework provides a set of common software components that mapping tools can reuse.

BRIEF DESCRIPTION OF THE DRAWINGS

FIG. 3A is an example of a source schema of FIG. 1A, in accordance with embodiments of the present invention.

FIG. 3B is an example of a target schema of FIG. 1A, in accordance with embodiments of the present invention.

FIG. 4A is a logical representation of the source schema of FIG. 3A, in accordance with embodiments of the present invention.

FIG. 4B is a logical representation of the target schema of FIG. 3B, in accordance with embodiments of the present invention.

FIG. 5B depicts an MSL instance of the mapping of FIG. 5A, in accordance with embodiments of the present invention.

DETAILED DESCRIPTION OF THE INVENTION

Introduction to Schema Mapping

Figure 1A:
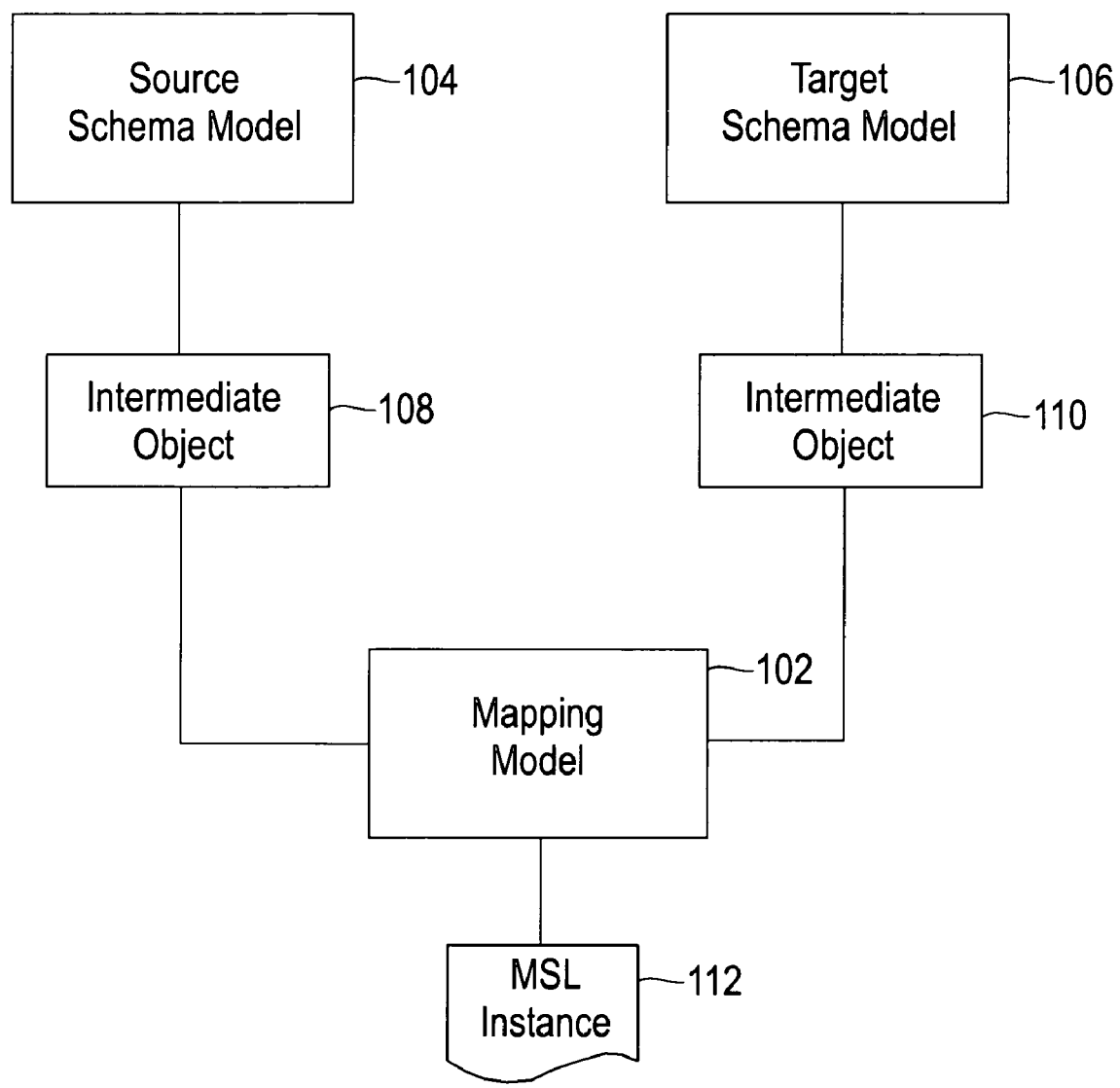
FIGS. 1A and 1B depict components of a system providing a schema mapping specification framework, in accordance with embodiments of the present invention.

Schema mapping is the process of specifying a correspondence between two data models. Purposes of schema mapping include:

(1) Capturing the correspondence as metadata: Some applications want to record a relationship between an object or structure in one schema model with another object or structure in another schema model. For instance, given two database schemas, users might want to capture which columns in the first database are related to which columns in the second database.

(2) Data Transformation/Exchange: The schema mapping is converted (or compiled) into a program (or query) that converts data represented from one structural representation into another. For instance, suppose Bank A has its data stored in a large centralized database. Bank A acquires Bank B and needs to migrate data from Bank B to Bank A's database. To perform the migration, a schema mapping is defined between the schema structure of Bank B and the schema structure of Bank A. This mapping specification is converted into a computer program that performs the actual migration of the data in Bank B into Bank A.

Overview of the Schema Mapping Framework

U.S. Patent Application Publication No. 2004/0199905 A1 (Fagin et al.), which is hereby incorporated herein by reference in its entirety, describes data transformation/exchange algorithms that compile simple mapping specifications into complex programs. Fagin et al. does not address how to provide an architecture (i.e., a framework) of the system so that multiple kinds of schemas can use the mapping algorithms described therein. The present invention, however, provides a framework that is needed to map across a heterogeneous set of schemas. The framework described herein is also referred to as the "schema mapping specification framework," "schema mapping framework" or simply the "mapping framework."

The mapping framework facilitates the creation of mapping applications between different kinds of schemas (i.e., heterogeneous schemas) by providing a common representation that results in a common set of mapping tools. As used herein, a schema is defined as an instance of a data model. A schema describes how data is modeled for a particular application. For example, a relational database schema models data as tables with columns and rows, where each column represents an attribute of the data, and each row contains data conforming to those attributes. Various schema models supported by mapping tools include: (1) relational databases RDB), (2) XML Schema/Document Type Definition (DTD), (3) Web Services Description Language (WSDL) specification, (4) Java® data structures and Enterprise Java Beans (EJB), and (5) Unified Modeling Language (UML) models. An instance of any schema model may need to be mapped into any other schema model, thereby creating multiple combinations of mappings (e.g., RDB-to-XML Schema, EJB-to-RDB, XML Schema-to-XML Schema, WSDL-to-XML Schema, etc.). Instead of requiring the development of separate mapping applications/tools for each combination, the present invention unifies the underlying needs of the applications and results in the consolidation of mapping tools.

Figure 1B:
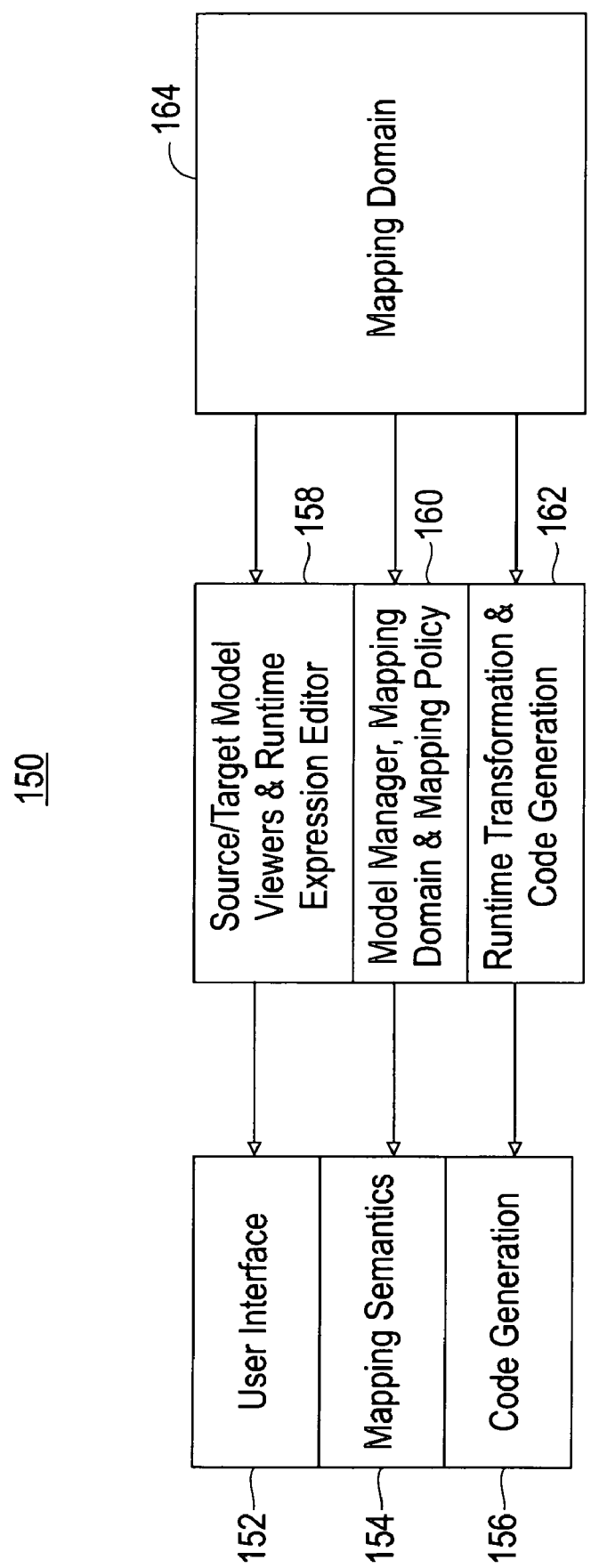

FIGS. 1A and 1B depict components of a system providing a schema mapping framework, in accordance with embodiments of the present invention. The schema mapping framework includes three main components: (1) a common mapping model (i.e., Mapping Specification Language or MSL), (2) a core set of runtime components, and (3) a set of software extension points (i.e., extensions to the core set of components). These three components are described below relative to FIG. 1A and 1B.

System 100 of FIG. 1A depicts the mapping model component of the schema mapping framework. Mapping model 102 provides a specification of a mapping between a source schema model 104 and a target schema model 106. Mapping model 102 represents mapping specifications as a tree of mapping objects. A mapping object includes a pointer to an intermediate object that logically represents and includes a pointer to source schema model 104 or target schema model 106. In FIG. 1A, a first intermediate object 108 pointing to source schema 104 is created by a model manager module (not shown), and a second intermediate object 110 pointing to target schema 106 is created by the model manager module. The model manager includes a Domain Resolver module (not shown) that performs the creation of intermediate objects 108 and 110. The Domain Resolver module is described in more detail below.

Mapping model 102 is stored to disk or other persistent storage and restored to memory using a serialization format (e.g., XML format). In one embodiment, mapping model 102 is stored as MSL instance 112 in a format (e.g., XML format) that is human-readable. As used herein, a human-readable format is defined as a non-binary representation designed to be directly and naturally read by humans. MSL instance 112 can be read and directly edited by users using any text editor.

System 150 of FIG. 1B includes the core set of runtime components and the extension points of the schema mapping framework. The core set of runtime components are used to load a mapping model instance (i.e., MSL instance 112 of FIG. 1A) into memory and resolve its logical references to actual schema objects being mapped. The core set of components 152, 154, 156 include runtime code for: (1) managing a user interface, (2) managing the semantics of the mapping, and (3) managing code generation, respectively. Each of these core components is associated with one or more software extension points. An extension point defines an extension to the functionality of the associated core component for a particular mapping application. User interface component 152 is associated with extension points 158, which include source and target model viewers and a runtime expression editor. Mapping semantics component 154 is associated with extension points 160, which include a model manager, a mapping domain, and a mapping policy. Code generation component 156 is associated with extension points 162, which include software for runtime transformation and code generation. A mapping tool designer groups the extension points 158, 160, 162 into a mapping domain definition 164, and registers the definition with the runtime environment.

To use the schema mapping framework described herein, software engineers use the common mapping model 102 (see FIG. 1A), and provide a number of software extension points 158, 160, 162 that the mapping framework will utilize to understand a particular mapping domain. The common mapping model is a static portion of the mapping framework. Core components 152, 154, 156 and their extension points 158, 160, 162 are a runtime, dynamic portion of the mapping framework.

Figure 2:
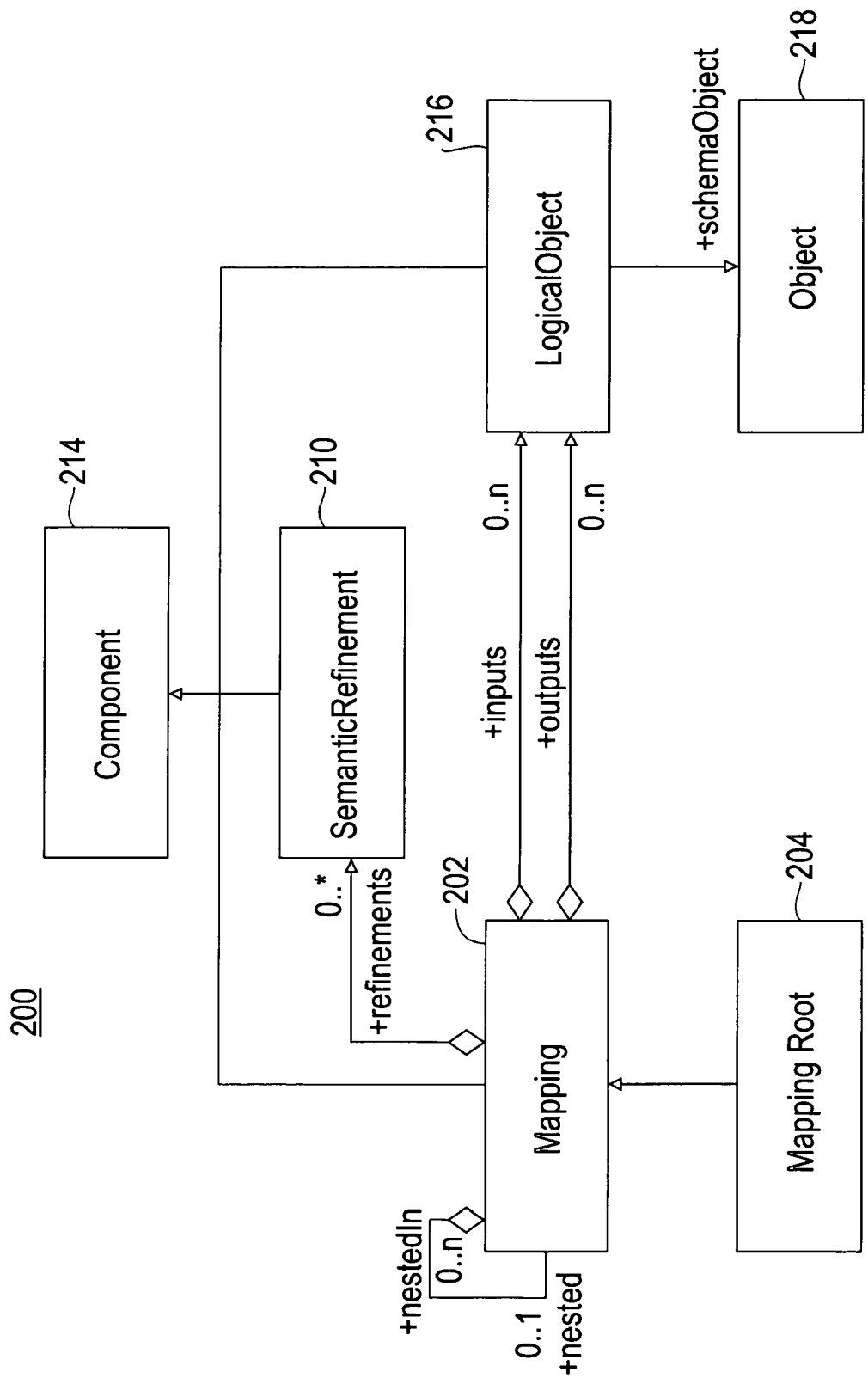
FIG. 2 is a class diagram of one implementation of a mapping model included in the schema mapping specification framework of FIG. 1A, in accordance with embodiments of the present invention.

FIG. 2 is a UML class diagram of one implementation of a mapping model included in the schema mapping framework of FIG. 1A, in accordance with embodiments of the present invention. MSL mapping model 200 is only one implementation of a mapping model included in the schema mapping framework. The present invention contemplates other realizations of the mapping model. MSL mapping model 200 includes mapping class 202, mapping root class 204, semantic refinement class 210, component class 214, LogicalObject class 216 and Object class 218. Object class 218 is a super class (i.e., a catch-all class) for all classes used in schema models. Each arrow in FIG. 2 that has a filled arrowhead denotes object-oriented inheritance between a child class and a parent class. These filled arrows start from the child class and point to the parent class. For example, the arrow between class 204 and class 202 indicates that child class 204 (i.e., mapping root) inherits the identical functionality of parent class 202 (i.e., mapping).

A composition aggregation association is denoted in FIG. 2 by a solid line with an open arrowhead on one end and a filled diamond on the other end. Two composition aggregation associations, each having a multiplicity of 0 . . . n, exist between mapping class 202 and LogicalObject class 216. One of these associations between class 202 and 216 (i.e., indicated By +inputs) denotes an association to input objects (i.e., source objects), and the other association (i.e., indicated by +outputs) denotes an association to output objects (i.e., target objects). A composition aggregation association also exists between mapping class 202 and SemanticRefinement class 210. A unidirectional association, indicated by the open arrow, exists between LogicalObject class 216 and Object class 218.

Instances of mapping class 202 are nested within other mapping instances, forming a tree of mapping objects in memory using the "nested" and "nestedIn" relationships. Mapping root 204 is a particular mapping object that is positioned at the top level of the mapping object tree.

Component class 214 is the parent class of all objects in mapping model 102 (see FIG. 1A), and is used to facilitate programming. All objects in the mapping model can be cast and passed as Components of the Component class.

Every mapping object can be associated with zero or more semantic refinement objects of class 210. A semantic refinement object annotates the mapping with a domain-dependent expression that adds information about the mapping. For example, in a mapping from two source objects called "firstName" and "lastName" into a target object called "fullName", a semantic refinement represents the function needed to concatenate the first name to the last name to create the full name (e.g., "concat(firstName, concat(' ', lastName))"). Each mapping object includes a list of input and output LogicalObject 216 objects (hereinafter, "logical objects"). Each logical object represents a logical endpoint of the mapping. A logical object stores a logical representation of the source or target schema object (e.g., an XPath expression that resolves to the schema object). At runtime, Domain Resolvers find the actual (a.k.a. physical) schema object pointed to by the information in the logical objects. The actual schema object is represented by the Object class 218.

Using the Schema Mapping Framework

To use the schema mapping framework, a mapping tools designer defines a new mapping domain 164 (see FIG. 1B) for an application. Defining mapping domain 164 (see FIG. 1B) includes, but is not limited to: (1) defining the kinds of schema models that can be mapped; (2) creating model managers; and (3) creating query generators. Each of these steps is described in more detail below:

Defining the kinds of schema models: In this step, the schema models that can appear on the source side of a mapping and the schema models that can appear on the target side of a mapping are registered. Further, the kind of query generators that are needed in the mapping domain are registered.

Creating model managers: For each kind of source and target schema model that can appear in the mapping, a model manager for that kind of schema model is defined. A model manager includes a Domain Resolver that the mapping model uses to resolve the logical paths over the schema model. Further, the valid schema endpoints are defined in this step (i.e., whether the mapping can be done from or to a particular schema object is defined).

Creating query generators: In this step, the kinds of Refinements that are valid for this mapping domain are provided. Optionally, for each kind of Refinement, an expression parser/validator for the string that encodes the refinement is provided. For example, if the Refinement JOIN is defined for a relational-to-relational mapping domain, the designer can provide an SQL expression parser to parse and validate the join expressions entered by the user. This step also provides a query generator.

Creating and Editing a Mapping Model Instance

Mapping tool designers logically group software extensions 158, 160, 162 (see FIG. 1B) into mapping domain 164 (see FIG. 1B). The runtime environment checks what mapping domains have been created and are available to create/edit mapping model instances 112 (see FIG. 1A).

To create a new mapping model instance 112 (see FIG. 1A), the runtime system determines how many mapping domains 164 (see FIG. 1B) are registered and offers the user a list of available mapping domains. A user chooses one of the mapping domains presented by the runtime system. As one example, there is a mapping domain defined for relational database to relational database mapping, another domain defined for XML Schema to relational database mapping, and still another domain defined for XML Schema to XML Schema mappings. In this example, the user receives a Wizard that prompts her or him to select relational to relational, XML Schema to relational, or XML Schema to XML Schema as the kind of mapping model instance to create. Once created, the mapping model instance retains knowledge of the mapping domain under which it was created.

To edit an existing mapping model instance 112 (see FIG. 1A), the user opens the mapping model instance. The instance 112 (see FIG. 1A) has knowledge of the mapping domain 164 (see FIG. 1B) under which it was created. If mapping domain 164 (see FIG. 1B) is registered, the associated GUI or editor will be opened and the associated GUI and semantic extensions are used for that model. Moreover, the Domain Resolvers associated with the source and the target schema models are located via mapping domain 164 (see FIG. 1B). The Domain Resolvers are used to convert the logical representation (e.g., path expressions) of the schema objects into pointers to the schema objects.

EXAMPLE

FIGS. 3A, 3B, 4A, 4B, 5A, 5B, and 6-8 illustrate an example of how Domain Resolvers are used in the schema mapping framework. Again, domain resolvers are defined in model managers 108, 110 (see FIG. 1A), which are extension points in the schema mapping framework. Two XML schemas are used in this example. Schema 300 in FIG. 3A is an example of a source schema, which is a serialized version of source schema model 104 of FIG. 1A. Schema 350 in FIG. 3B is an example of a target schema, which is a serialized version of target schema model 106 of FIG. 1A. When the source and target schemas are loaded into memory, each element in that schema becomes a node in a tree. In each of schema 300 of FIG. 3A and schema 350 of FIG. 3B, there is a top-level schema object and one or more element or type definitions under the top-level object.

The schema mapping framework provides to the user a logical representation of the source and target schemas. In this example, schema 400 of FIG. 4A is a logical representation of the source schema of FIG. 3A. Further, schema 450 of FIG. 4B is a logical representation of the target schema of FIG. 3B. Source schema 400 of FIG. 4A includes a set of book objects. Each book object has a year, a title, and an author structure. Target schema 450 of FIG. 4B includes a set of publications, each including a year and a list of author names and titles.

Figure 5A:
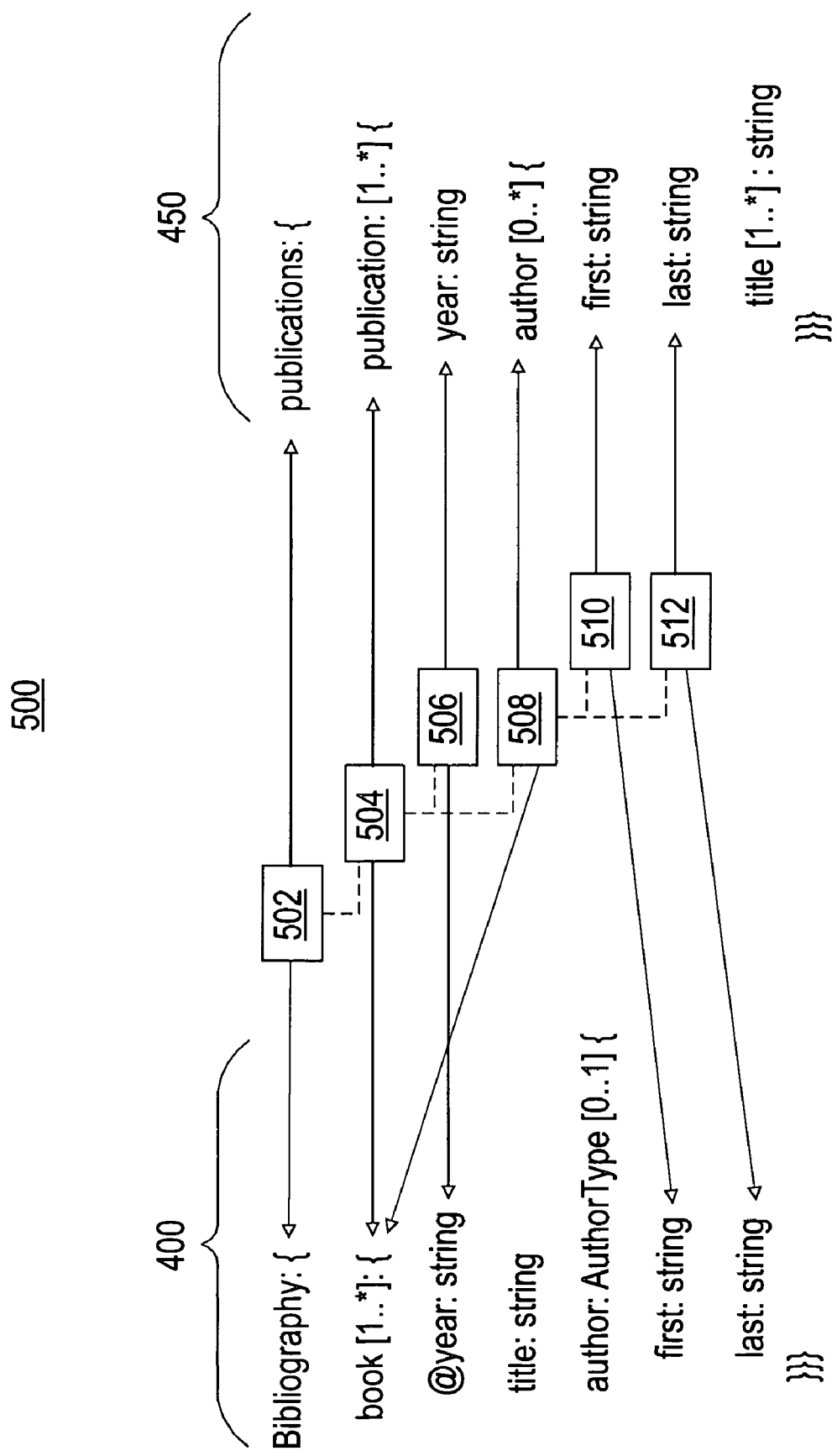
FIG. 5A depicts a mapping between the source and target schema representations of FIGS. 4A and 4B, in accordance with embodiments of the present invention.

The mapping model of the schema mapping framework represents the mapping between a source and target schema model at a logical level that utilizes the logical representations of FIGS. 4A and 4B. FIG. 5A depicts a mapping 500 between source schema 400 (see FIG. 4A) and target schema 450 (see FIG. 4B). Mapping 500 includes a mapping root 502 and mapping objects 504, 506, 508, 510 and 512. The dashed lines indicate nested relationships between objects. In this example, mapping object 504 is nested in mapping root 502, mapping objects 506 and 508 are nested in mapping object 504, and mapping objects 510 and 512 are nested in mapping object 508. In FIG. 5A, the arrows pointing to the left indicate pointers to input side objects (i.e., objects of the source schema), and arrows pointing to the right indicate pointers to output side objects (i.e., objects of the target schema).

To represent the mapping at the logical level, each mapping object contains a logical reference (e.g., a path expression) to the actual object in one of the schemas participating in the mapping (i.e., the source schema of FIG. 3A or the target schema of FIG. 3B). One or more of these logical references are input references associated with input side objects, and one or more logical references are output references associated with output side object. Such logical references are included in the MSL serialization 550 of FIG. 5B. MSL serialization 550 is an MSL instance of mapping 500 (see FIG. 5A). Each input and output endpoint (i.e., each object pointed to by an arrow of mapping 500 in FIG. 5A) is represented by a path expression (e.g., "$s0/author/first") in MSL serialization 550. The path expressions are what the Domain Resolvers evaluate and resolve into actual schema objects.

Figure 6:
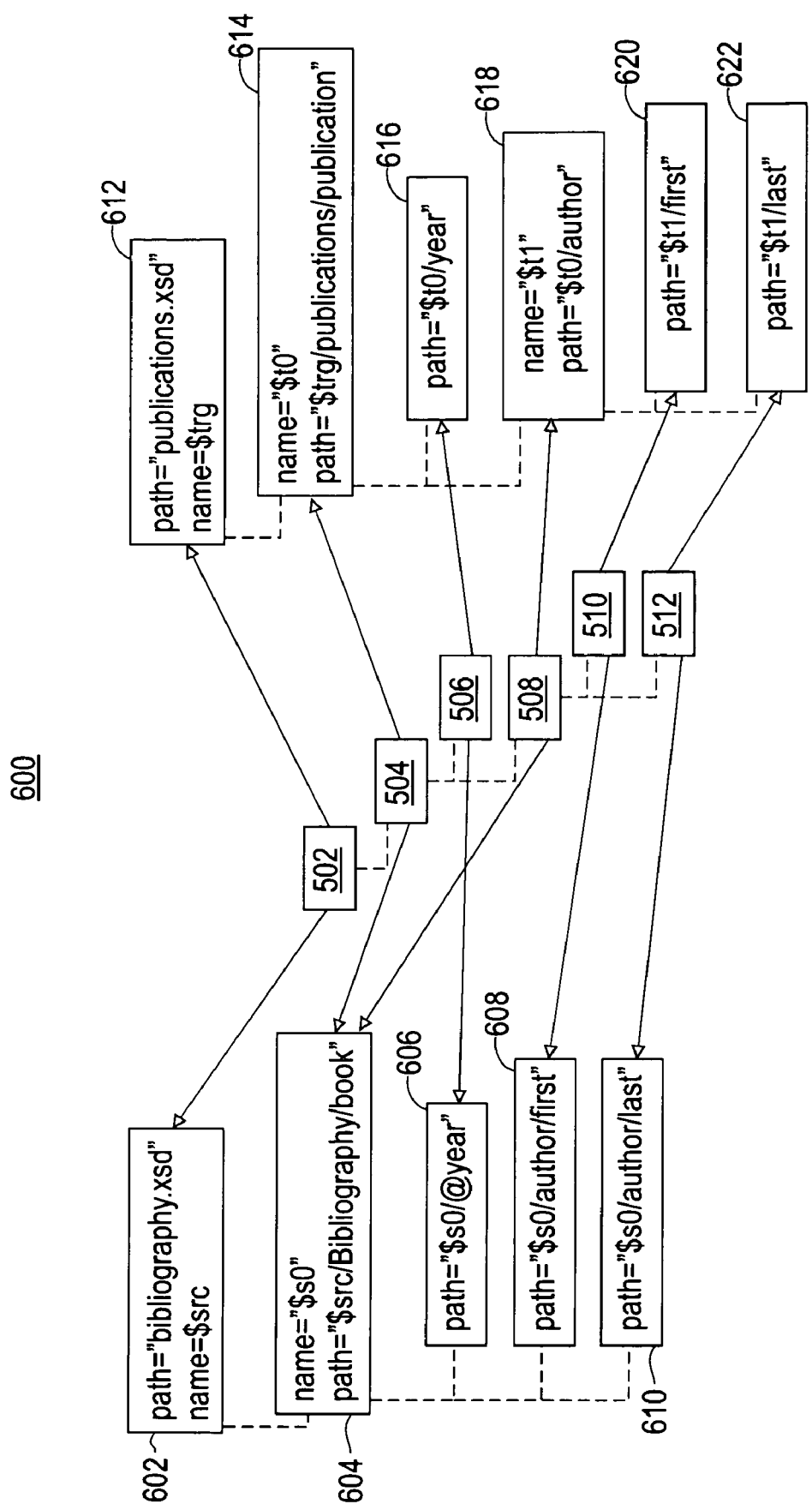
FIG. 6 depicts a memory representation of the MSL instance of FIG. 5B, in accordance with embodiments of the present invention.

In response to MSL serialization 550 (see FIG. SB) being read into memory, a core mapping model tree is created, and for each input and output reference, a logical object is created. Using a Domain Resolver, each logical reference is resolved to the actual schema object in the physical schema model of FIG. 3A or 3B. FIG. 6 depicts a memory representation (a.k.a. memory model) 600 of MSL serialization 550 (see FIG. SB). That is, memory representation 600 depicts the representation of MSL serialization 550 (see FIG. SB) after it is read into memory and logical objects are created, but before the Domain Resolvers resolve the logical references included in the logical objects. Memory model 600 includes logical objects 602, 604, 606, 608, and 610 on the source side of the model, and logical objects 612, 614, 616, 618, 620 and 622 on the target side of the model. The arrows pointing to the aforementioned logical objects indicate which logical objects are included in mapping objects 502, 504, 506, 508, 510 and 512.

All the information needed to serialize the mapping model back to its XML representation is captured in memory model 600 in FIG. 6. After the logical references are resolved by the Domain Resolvers, the source and target objects pointed to are also available, but these objects do not need to be serialized into the mapping file. The logical references contain all the information needed to reconstruct the mapping.

Figure 7:
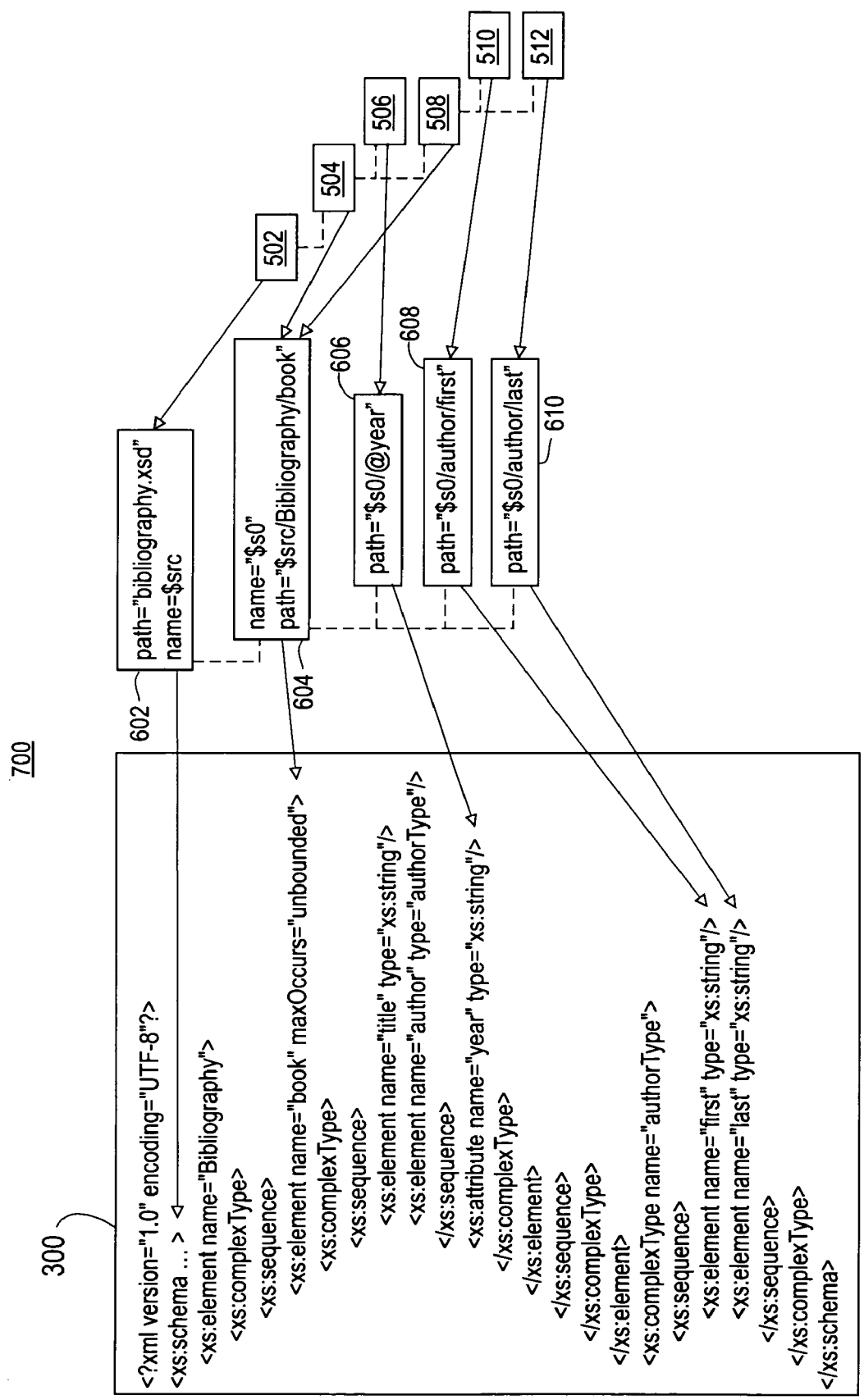
FIG. 7 depicts a source side of the mapping of FIG. 6 after the mapping is resolved, in accordance with embodiments of the present invention.
Figure 8:
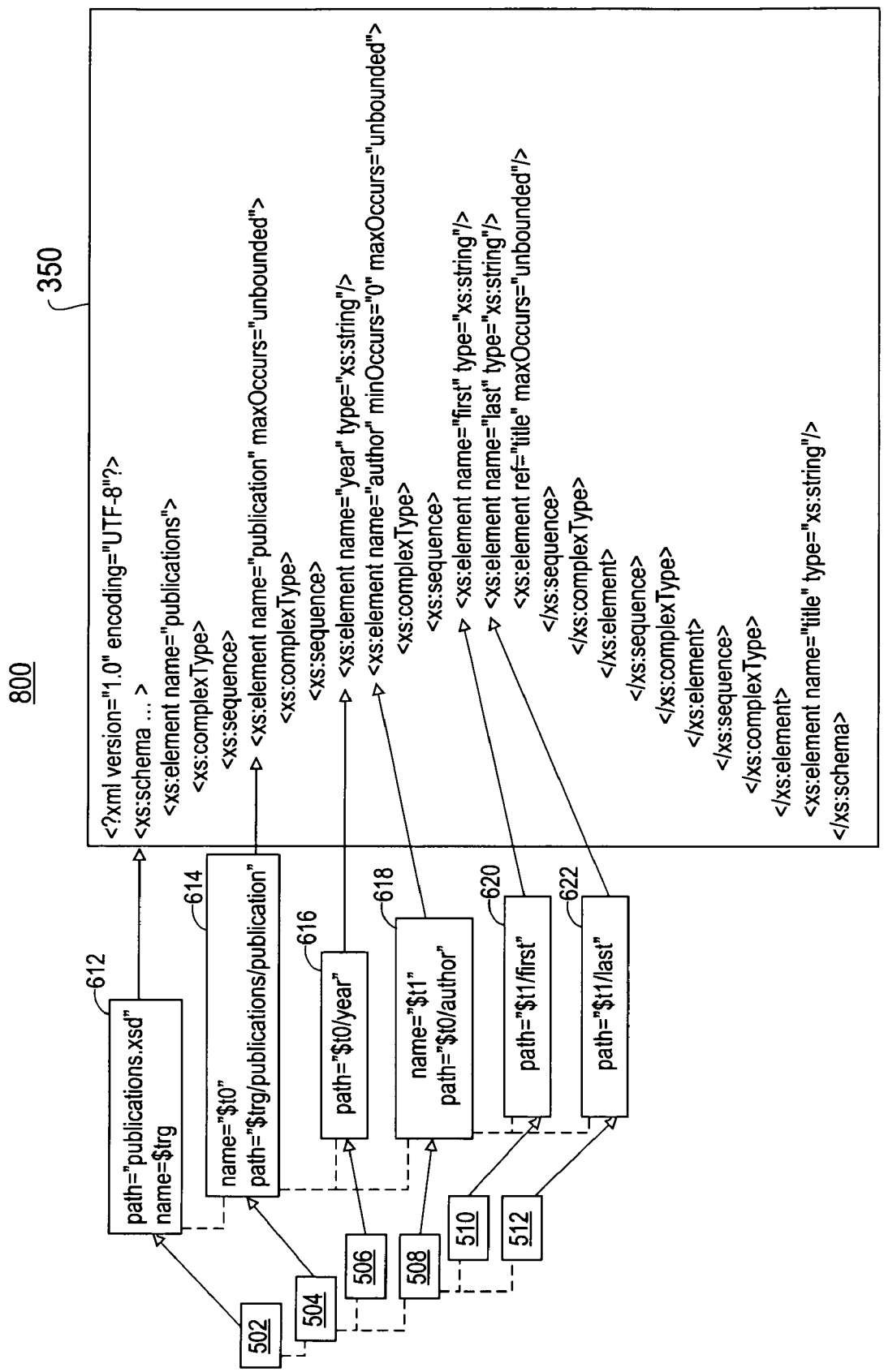
FIG. 8 depicts a target side of the mapping of FIG. 6 after the mapping is resolved, in accordance with embodiments of the present invention.

FIG. 7 depicts a source side 700 of memory representation 600 of FIG. 6 after the mapping is resolved by Domain Resolvers. Similarly, FIG. 8 depicts a target side 800 of the memory representation 600 of FIG. 6 after the mapping is resolved by Domain Resolvers. Source side 700 in FIG. 7 includes mapping objects 502, 504, 506, 508, 510 and 512 (see also FIGS. SA and 6), logical objects 602, 604, 606, 608 and 610 (see also FIG. 6), and source schema model 300 (see also FIG. 3A). Target side 800 in FIG. 8 includes the same mapping objects as FIG. 7, as well as logical objects 612, 614, 616, 618 and 620 (see also FIG. 6), and target schema model 350 (see also FIG. 3B).

The application of the Domain Resolvers that results in FIGS. 7 and 8 include the following two steps:

(1) The input and output logical references for the top-level mapping root 502 (see FIGS. 7 and 8) are resolved. That is, the logical references included in logical objects 602 (see FIG. 7) and 612 (see FIG. 8) are resolved by Domain Resolvers associated with the source schema and target schema, respectively. These logical references for the mapping root point to files that include physical schema objects. The logical reference included in logical object 602 (see FIG. 7) includes the filename identifying where a serialization of the source schema model (i.e., source schema model 300 of FIG. 7) is located. Similarly, the logical reference included in logical object 612 (see FIG. 8) includes the filename identifying where a serialization of the target schema model (i.e., target schema model 350 of FIG. 8) is located. The files referenced by the logical references are opened, and the actual schema model is loaded into memory. The model manager opens the referenced files using the filenames stored in the logical references. The computing system that implements the schema mapping framework recognizes the files as schema models, and invokes the appropriate reader to read the schema models into memory (i.e., to create the memory representation of the schema models). Schema models 300 (see FIG. 7) and 350 (see FIG. 8) are serializations of the schema models being referenced. Although not shown in FIGS. 7 and 8, the actual memory representation of the source schema is a first tree that represents the nesting levels shown in serialized schema model 300 (see FIG. 7), and the actual memory representation of the target schema is a second tree that represents the nesting levels shown in serialized schema model 350 (see FIG. 8). Thus, the depiction of logical objects pointing to serialized schema models in FIGS. 7 and 8 is for illustration purposes only. Although not shown, the logical objects of the mapping model actually point to nodes of the aforementioned first and second trees.

(2) The nested hierarchy of mappings (i.e., the mapping tree) is traversed. At each level of the hierarchy, the input and output path references are resolved by walking the schema model until the object pointed to by the logical reference is found. The Domain Resolver associated with a schema model prescribes the manner in which that schema model is walked. After the object referenced by the logical reference is found, a pointer to that object is stored in the associated logical object. For instance, the input logical reference associated with logical object 604 is resolved by walking the source schema model 300 of FIG. 7 until finding the object <xs: element name="book" maxOccurs="unbounded">, and a pointer to the found object is stored in logical object 604.

After the above-described resolving performed by the Domain Resolvers is complete for each level of the mapping tree, a mapping model exists in memory that includes both the logical representation of the mapping and pointers to the actual schema objects participating in the mapping.

The mapping model provided by the schema mapping framework described herein does not rely on the technique of embedding the mapping within one or more schema models that uses annotations from multiple mappings mixed in a single schema model. Thus, the present invention facilitates (1) the modification of schema models, and (2) the provision of multiple mappings using a single source schema model.

Further, the present invention provides a mapping that is stored as a resource that is separate from the schema models. The mapping of the present invention points to the actual schema objects participating in the mapping only indirectly, via intermediate logical representations of the schema objects participating in the mapping. The intermediate logical representations are included in the logical objects (a.k.a. intermediate objects) described above. Domain resolvers in the present invention facilitate the modification of the intermediate logical representations, so that different kinds of schemas can be supported by the schema mapping framework.

Computing System

Figure 9:
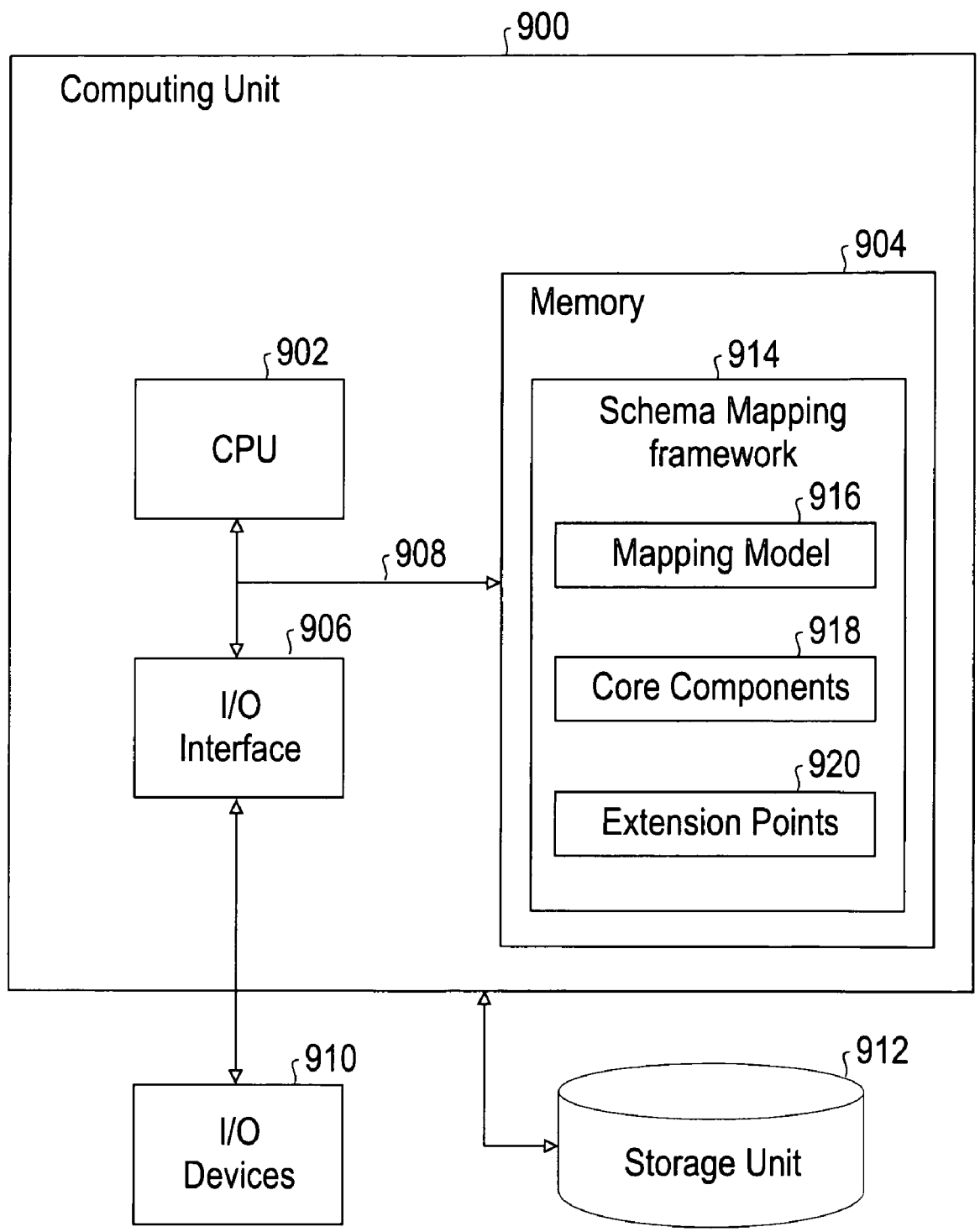
FIG. 9 is a block diagram of a computing unit implementing the schema mapping specification framework of FIGS. 1A and 1B, in accordance with embodiments of the present invention.

FIG. 9 is a block diagram of a computing unit 900 for implementing the schema mapping framework of FIGS. 1A and 1B, in accordance with embodiments of the present invention. Computing unit 900 generally comprises a central processing unit (CPU) 902, a memory 904, an input/output (I/O) interface 906, a bus 908, I/O devices 910 and a storage unit 912. CPU 902 performs computation and control functions of computing unit 900. CPU 902 may comprise a single processing unit, or be distributed across one or more processing units in one or more locations (e.g., on a client and server). Memory 904 may comprise any known type of data storage, including magnetic media, optical media, random access memory (RAM), read-only memory (ROM), a data cache, a data object, etc. Storage unit 912 is, for example, a magnetic disk drive or an optical disk drive. Moreover, similar to CPU 902, memory 904 may reside at a single physical location, comprising one or more types of data storage, or be distributed across a plurality of physical systems in various forms. Further, memory 904 can include data distributed across, for example, a LAN, WAN or storage area network (SAN) (not shown).

I/O interface 906 comprises any system for exchanging information to or from an external source. I/O devices 910 comprise any known type of external device, including a display monitor, keyboard, mouse, printer, speakers, handheld device, printer, facsimile, etc. Bus 908 provides a communication link between each of the components in computing unit 900, and may comprise any type of transmission link, including electrical, optical, wireless, etc.

I/O interface 906 also allows computing unit 900 to store and retrieve information (e.g., program instructions or data) from an auxiliary storage device, such as a non-volatile storage device (e.g., a CD-ROM drive which receives a CD-ROM disk) (not shown). Computing unit 900 can store and retrieve information from other auxiliary storage devices (not shown), which can include a direct access storage device (DASD) (e.g., hard disk or floppy diskette), a magneto-optical disk drive, a tape drive, or a wireless communication device.

Memory 904 includes computer program code comprising a schema mapping framework 914 that includes program code for a mapping model 916, core components 918 and extension points 920. The program code 916, 918, and 920 respectively implement mapping model 102 (see FIG. 1A), core components 152, 154, 156 (see FIG. 1B), and extension points 158, 160, 162 (see FIG. 1B). Further, memory 904 may include other systems not shown in FIG. 9, such as an operating system (e.g., Linux) that runs on CPU 902 and provides control of various components within and/or connected to computing unit 900.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code 914 for use by or in connection with a computing unit 900 or any instruction execution system to provide and facilitate the capabilities of the present invention. For the purposes of this description, a computer-usable or computer-readable medium can be any apparatus that can contain or store the program for use by or in connection with the instruction execution system, apparatus, or device.

The medium can be an electronic, magnetic, optical, or semiconductor system (or apparatus or device). Examples of a computer-readable medium include a semiconductor or solid state memory, magnetic tape, a removable computer diskette, RAM 904, ROM, a rigid magnetic disk and an optical disk. Current examples of optical disks include compact disk-read-only memory (CD-ROM), compact disk-read/write (CD-R/W) and DVD.

A computing system 900 suitable for storing and/or executing program code 914 includes at least one processor 902 coupled directly or indirectly to memory elements 904 through a system bus 908. The memory elements can include local memory employed during actual execution of the program code, bulk storage, and cache memories which provide temporary storage of at least some program code in order to reduce the number of times code must be retrieved from bulk storage during execution.

The flow diagrams depicted herein are provided by way of example. There may be variations to these diagrams or the steps (or operations) described herein without departing from the spirit of the invention. For instance, in certain cases, the steps may be performed in differing order, or steps may be added, deleted or modified. All of these variations are considered a part of the present invention as recited in the appended claims.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A computer-implemented method of specifying, in a schema mapping framework of a computing environment, a mapping between a source schema model and a target schema model, the method comprising:

registering, by a computing system, a first plurality of heterogeneous schema models and a second plurality of heterogeneous schema models;

receiving a mapping domain that identifies said mapping between said source schema model included in said first plurality of heterogeneous schema models and said target schema model included in said second plurality of heterogeneous schema models, wherein said source schema model and said target schema model are different schema model types;

specifying a mapping model of said schema mapping framework represents said mapping between said source schema model and said target schema model;

serializing said mapping model of said schema mapping framework into a first plurality of mapping objects in a serialization of said source schema model and a second plurality of mapping objects in a serialization of said target schema model, wherein said first plurality of mapping objects is in a first plurality of hierarchical levels and includes a first set of one or more path expressions, wherein said second plurality of mapping objects is in a second plurality of hierarchical levels and includes a second set of one or more path expressions, wherein said first set of one or more path expressions represents one or more source objects in a one-to-one correspondence, wherein said second set of one or more path expressions represents one or more target objects in a one-to-one correspondence, and wherein said serializing includes storing said serialization of said source schema model and said serialization of said target schema model in a computer data storage device;

loading said first and second plurality of mapping objects in said serialization of said source schema model and said serialization of said target schema model into a memory coupled to said computing system;

creating a mapping model tree in said memory, wherein said mapping model tree represents said mapping model, wherein said mapping model tree includes one or more source logical objects and one or more target logical objects, wherein said one or more source logical objects includes said first set of one or more path expressions, and wherein said one or more target logical objects includes said second set of one or more path expressions;

resolving said first set of one or more path expressions to said one or more source objects, wherein said resolving said first set of one or more path expressions includes:

identifying a path expression of said first set of one or more path expressions, wherein said path expression of said first set of one or more path expressions includes an identification of a first computer file that includes said serialization of said source schema model;

opening said first computer file using said identification of said first computer file;

storing, in said memory and responsive to said opening said first computer file, said serialization of said source schema model as a first tree data structure representing said first plurality of hierarchical levels; and traversing said one or more source logical objects of said mapping model tree to locate said one or more source objects that are associated with said one or more source logical objects in a one-to-one correspondence via said first set of one or more path expressions, wherein said traversing said one or more source logical objects includes storing in each source logical object a pointer to a corresponding source object of said one or more source objects; and resolving said second set of one or more path expressions to said one or more target objects, wherein said resolving said second set of one or more path expressions includes:

storing in said mapping model tree a target side set of one or more pointers to said one or more target objects;

identifying a path expression of said second set of one or more path expressions, wherein said path expression of said second set of one or more path expressions includes an identification of a second computer file that includes said serialization of said target schema model;

opening said second computer file using said identification of said second computer file;

storing, in said memory and responsive to said opening said second computer file, said serialization of said target schema model as a second tree data structure representing said second plurality of hierarchical levels; and traversing said one or more target logical objects of said mapping model tree to locate said one or more target objects that are associated with said one or more target logical objects in a one-to-one correspondence via said second set of one or more path expressions, wherein said traversing said one or more target logical objects includes storing in each target logical object a pointer to a corresponding target object of said one or more target objects.

2. A computing system comprising a processor coupled to a computer-readable memory unit, said memory unit comprising a software application and instructions that when executed by said processor cause the computing system to specify, in a schema mapping framework of a computing environment, a method for a mapping between a source schema model and a target schema model, said method comprising:

registering, by a computing system, a first plurality of heterogeneous schema models and a second plurality of heterogeneous schema models;

receiving a mapping domain that identifies a mapping between a said source schema model included in said first plurality of heterogeneous schema models and a said target schema model included in said second plurality of heterogeneous schema models, wherein said source schema model and said target schema model are different schema model types;

specifying a mapping model of said schema mapping framework represents said mapping between said source schema model and said target schema model;

serializing said mapping model of said schema mapping framework into a first plurality of mapping objects in a serialization of said source schema model and a second plurality of mapping objects in a serialization of said target schema model, wherein said first plurality of mapping objects is in a first plurality of hierarchical levels and includes a first set of one or more path expressions, wherein said second plurality of mapping objects is in a second plurality of hierarchical levels and includes a second set of one or more path expressions, wherein said first set of one or more path expressions represents one or more source objects in a one-to-one correspondence, wherein said second set of one or more path expressions represents one or more target objects in a one-to-one correspondence, and wherein said serializing includes storing said serialization of said source schema model and said serialization of said target schema model in a computer data storage device;

loading said first and second plurality of mapping objects in said serialization of said source schema model and said serialization of said target schema model into a memory coupled to said computing system;

creating a mapping model tree in said memory, wherein said mapping model tree represents said mapping model, wherein said mapping model tree includes one or more source logical objects and one or more target logical objects, wherein said one or more source logical objects includes said first set of one or more path expressions, and wherein said one or more target logical objects includes said second set of one or more path expressions;

resolving said first set of one or more path expressions to said one or more source objects, wherein said resolving said first set of one or more path expressions includes:

identifying a path expression of said first set of one or more path expressions, wherein said path expression of said first set of one or more path expressions includes an identification of a first computer file that includes said serialization of said source schema model;

opening said first computer file using said identification of said first computer file;

storing, in said memory and responsive to said opening said first computer file, said serialization of said source schema model as a first tree data structure representing said first plurality of hierarchical levels; and traversing said one or more source logical objects of said mapping model tree to locate said one or more source objects that are associated with said one or more source logical objects in a one-to-one correspondence via said first set of one or more path expressions, wherein said traversing said one or more source logical objects includes storing in each source logical object a pointer to a corresponding source object of said one or more source objects; and resolving said second set of one or more path expressions to said one or more target objects, wherein said resolving said second set of one or more path expressions includes:

storing in said mapping model tree a target side set of one or more pointers to said one or more target objects;

identifying a path expression of said second set of one or more path expressions, wherein said path expression of said second set of one or more path expressions includes an identification of a second computer file that includes said serialization of said target schema model;

opening said second computer file using said identification of said second computer file;

storing, in said memory and responsive to said opening said second computer file, said serialization of said target schema model as a second tree data structure representing said second plurality of hierarchical levels; and traversing said one or more target logical objects of said mapping model tree to locate said one or more target objects that are associated with said one or more target logical objects in a one-to-one correspondence via said second set of one or more path expressions, wherein said traversing said one or more target logical objects includes storing in each target logical object a pointer to a corresponding target object of said one or more target objects.

3. A computer program product comprising a computer-readable storage medium having a computer readable program code embodied therein, said computer readable program code containing instructions that when executed by a processor of a computing system cause the computing system to specify, in a schema mapping framework of a computing environment, a method for a mapping between a source schema model and a target schema model, said method comprising:

registering, by a computing system, a first plurality of heterogeneous schema models and a second plurality of heterogeneous schema models;

receiving, a mapping domain that identifies a mapping between a said source schema model included in said first plurality of heterogeneous schema models and said target schema model included in said second plurality of heterogeneous schema models, wherein said source schema model and said target schema model are different schema model types;

specifying a mapping model of said schema mapping framework represents said mapping between said source schema model and said target schema model;

serializing said mapping model of said schema mapping framework into a first plurality of mapping objects in a serialization of said source schema model and a second plurality of mapping objects in a serialization of said target schema model, wherein said first plurality of mapping objects is in a first plurality of hierarchical levels and includes a first set of one or more path expressions, wherein said second plurality of mapping objects is in a second plurality of hierarchical levels and includes a second set of one or more path expressions, wherein said first set of one or more path expressions represents one or more source objects in a one-to-one correspondence, wherein said second set of one or more path expressions represents one or more target objects in a one-to-one correspondence, and wherein said serializing includes storing said serialization of said source schema model and said serialization of said target schema model in a computer data storage device;

loading said first and second plurality of mapping objects in said serialization of said source schema model and said serialization of said target schema model into a memory coupled to said computing system;

creating a mapping model tree in said memory, wherein said mapping model tree represents said mapping model, wherein said mapping model tree includes one or more source logical objects and one or more target logical objects, wherein said one or more source logical objects includes said first set of one or more path expressions, and wherein said one or more target logical objects includes said second set of one or more path expressions;

resolving said first set of one or more path expressions to said one or more source objects, wherein said resolving said first set of one or more path expressions includes:

identifying a path expression of said first set of one or more path expressions, wherein said path expression of said first set of one or more path expressions includes an identification of a first computer file that includes said serialization of said source schema model;

opening said first computer file using said identification of said first computer file;

storing, in said memory and responsive to said opening said first computer file, said serialization of said source schema model as a first tree data structure representing said first plurality of hierarchical levels; and traversing said one or more source logical objects of said mapping model tree to locate said one or more source objects that are associated with said one or more source logical objects in a one-to-one correspondence via said first set of one or more path expressions, wherein said traversing said one or more source logical objects includes storing in each source logical object a pointer to a corresponding source object of said one or more source objects; and resolving said second set of one or more path expressions to said one or more target objects, wherein said resolving said second set of one or more path expressions includes:

storing in said mapping model tree a target side set of one or more pointers to said one or more target objects;

identifying a path expression of said second set of one or more path expressions, wherein said path expression of said second set of one or more path expressions includes an identification of a second computer file that includes said serialization of said target schema model;

opening said second computer file using said identification of said second computer file;

storing, in said memory and responsive to said opening said second computer file, said serialization of said target schema model as a second tree data structure representing said second plurality of hierarchical levels; and traversing said one or more target logical objects of said mapping model tree to locate said one or more target objects that are associated with said one or more target logical objects in a one-to-one correspondence via said second set of one or more path expressions, wherein said traversing said one or more target logical objects includes storing in each target logical object a pointer to a corresponding target object of said one or more target objects.

* * * * *